Dec. 7, 1971  M. MICHEL  3,625,037
AUTOMATIC GAUGE CONTROL SYSTEM FOR A ROLLING MILL
Filed Feb. 25, 1969  4 Sheets-Sheet 3
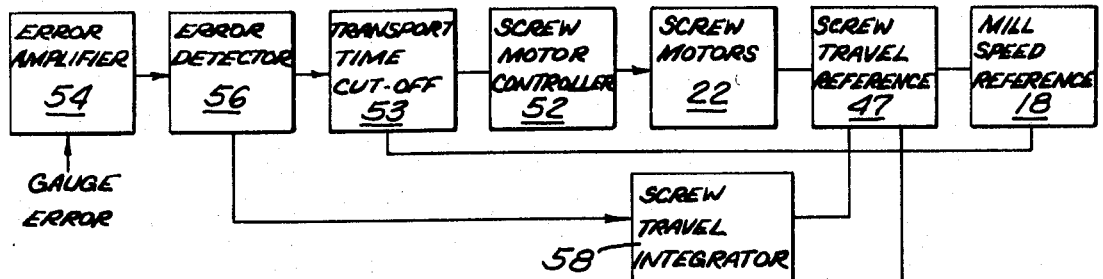
FIG. 3.
PHASE I.
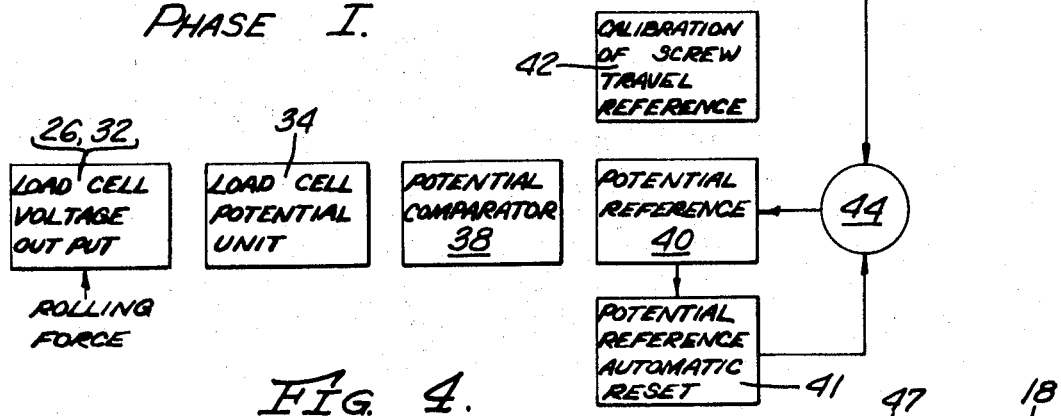
FIG. 4.
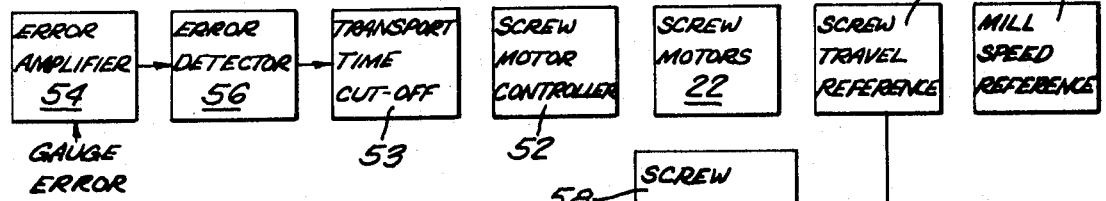
PHASE II.
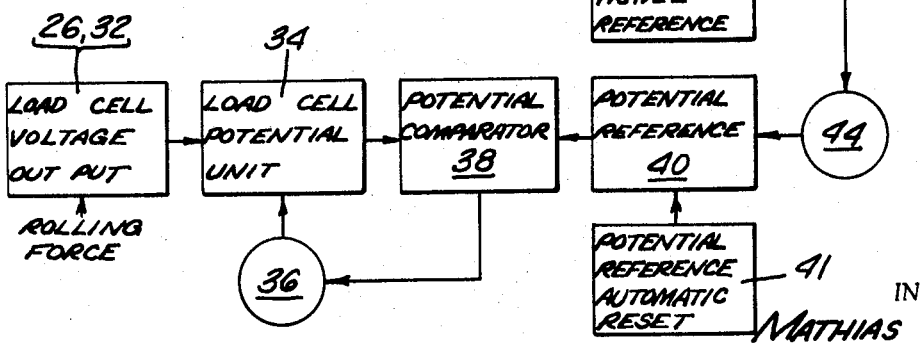
INVENTOR.
MATHIAS MICHEL
BY
Herbert E. Kidder
AGENT

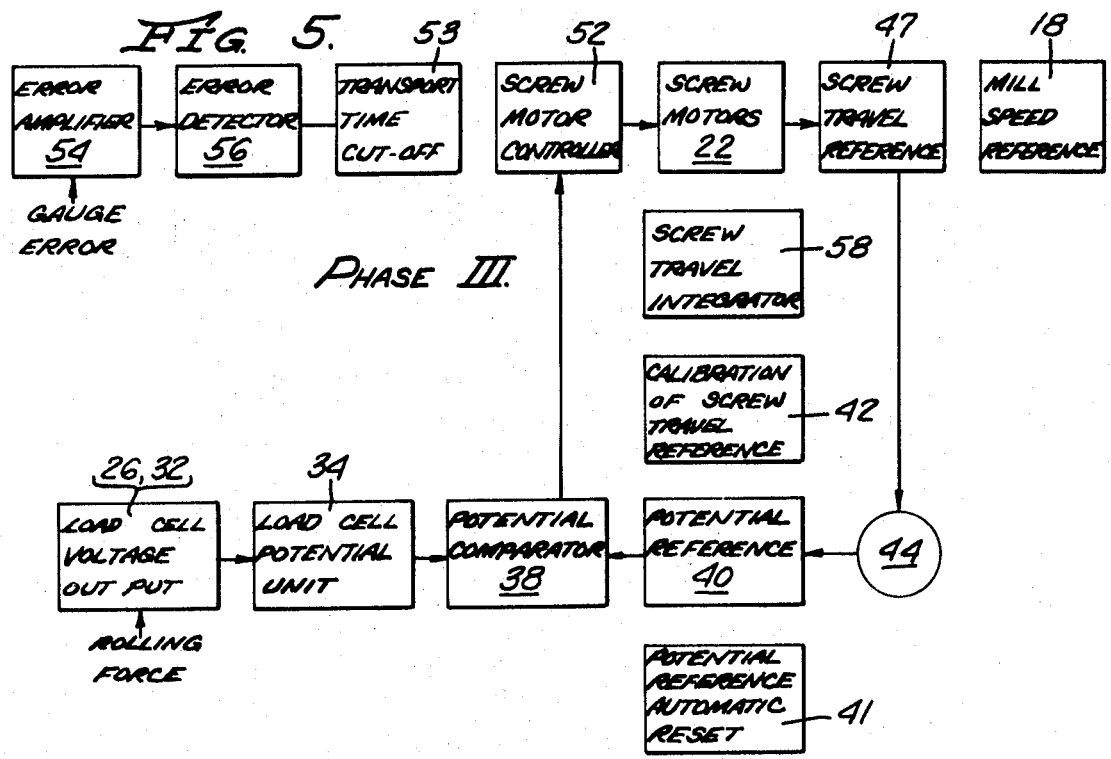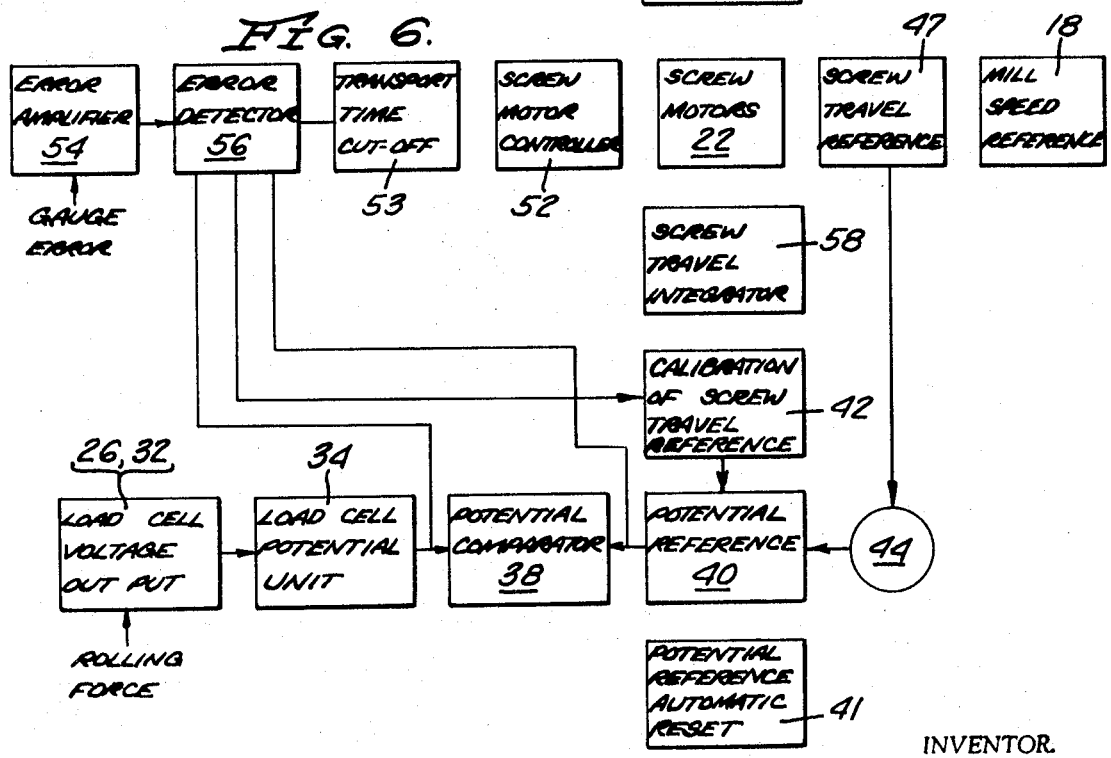

United States Patent Office 3,625,037
Patented Dec. 7, 1971

3,625,037
AUTOMATIC GAUGE CONTROL SYSTEM FOR A ROLLING MILL
Mathias Michel, Riverside, Calif., assignor to Hunter Engineering Company, Inc.
Filed Feb. 25, 1969, Ser. No. 801,974
Int. Cl. B21b *37/08*
U.S. Cl. 72—8          6 Claims

ABSTRACT OF THE DISCLOSURE

A system for automatically adjusting the opening between work rolls of a rolling mill to compensate for changes in incoming gauge. Corrective action is initiated by change in the roll separating force, as measured by a load cell, and is accomplished by a series of sequential servo mechanism operations which control the roll screws, and in which the total change in roll force is matched in a sensitive comparator against a reference signal that is modified as a function of screw travel, so that at the end of the gauge-correcting cycle, the potential change of the screw-operated reference potential is equal to the potential change of the load cell under the new force.

BACKGROUND OF THE INVENTION

The present invention relates generally to workpiece thickness control systems, and more particularly to control apparatus for a strip rolling mill using a thickness gauge on the delivery side of the mill having an electrical output proportional to the difference between the actual gauge and the desired gauge. This electrical output, which is proportional to the gauge error, can be used to readjust the opening of the work rolls in such a way as to reduce or eliminate the gauge error in one or several steps.

There are many installations in operation today, which operate on the above-described principle. They all have two features in common which make them less effective than they would theoretically appear to be. The first undesirable feature is due to the fact that the gauge is located at some distance from the centerline of the mill, so that it cannot detect instantly the effect of a change in roll opening, as made by the automatic gauge control system. For this reason, a waiting period, called transport time, is provided in this type of automatic gauge control, during which period all further action by the automatic gauge control is prevented, to allow the portion of strip which has been changed by a change in roll opening to travel from the rolls to the gauge. With this type of control, it is important to avoid over-correction, as this would lead to hunting back and forth across the desired gauge. For this reason, it is usual in this type of control to make a correction in gauge in a series of small steps, each one separated from the preceding step by the transport time. This is inefficient and permits a great amount of off-gauge metal to pass through the mill before the material is brought back on gauge.

The second shortcoming of the systems mentioned above is due to the fact that the magnitude of the corrective action is made to be proportional to the gauge error, whereas, in fact, the same gauge error requires different amounts of change in roll opening, depending on the characteristics of the metal being rolled in the mill. For example, the amount of screw travel necessary to correct a given gauge error may vary as much as in a ratio of 2 to 1. It can be demonstrated that the amount of screw travel necessary to correct a gauge deviation of $\Delta G$ is equal to $$\Delta G + \Delta G \left(\frac{R}{M}\right)$$

where $\Delta G$ is the change in gauge from normal (plus or minus), expressed in thousandths of an inch (mils); R is the average rolling force of the material in the mill, expressed in pounds per mil reduction; and M is the mill constant, or roll separating force required to produce an increase in the effective roll opening of one mil. If R equals M, the amount of screw travel required to correct a gauge error of $\Delta G$ is $2\Delta G$. In other words, for a gauge error of one mil, the roll opening would have to be changed by 2 mil in this case. At other times when R is relatively small, for example $\frac{1}{10}$ of M, the roll opening change would only be 1.1 mil for a gauge error of one mil.

A second method of automatic gauge control, which is widely used in multi-stand hot finishing mills, has been devised to overcome the disadvantages of transport time by taking the change in roll separating force as an indication that a change in roll opening is needed to hold a constant gauge. This system, known as the "gagemeter" system, is based on the equation: gauge equals the roll opening with no metal in the mill, plus the mill spring due to the roll separating force with metal in the mill. This may be expressed as follows:

$$h = S_0 + \frac{F}{M}$$

where $h$ is the exit gauge; $S_0$ is the roll opening with no metal in the mill; F is the roll separating force; and M is the mill constant. In this system, since $$S_0 + \frac{F}{M}$$

equals gauge, the automatic control is set to hold this term constant. If the nature of the metal in the roll bite changes so that F changes, then $S_0$ is changed to offset the change in F and hold the term $$S_0 + \frac{F}{M}$$

constant. If the amount of screw travel is based on the original change in F, then an additional change in roll opening may be necessary as a second step, as the screw travel itself produces a secondary change in F in the same direction as the first one. In other words, if the change in F was positive, indicating an increase in the rolling force, and as a consequence an increase in gauge, then the screw travel must reduce the roll opening in order to bring the metal back on gauge. This causes another increase in roll force, which results in a further mill spring and the need for an additional screw travel to further decrease the roll opening. The additional travel needed by the screw-down depends on the rolling characteristics of the metal being rolled.

Thus, it is evident that any automatic gauge control system based on a screw travel proportional to the initial change in pressure only, or to the change in gauge only, is correct only for one specific value of the rolling constant R. It is incorrect for all other values of R, and may require several screw operations in order to correct for a change in gauge. Moreover, prior automatic gauge control systems suffer from the disadvantages described above, in addition to which the accuracy of the gagemeter system depends upon how accurately the empty mill screw adjustment $S_0$ reflects the actual roll opening when the mill is unloaded. After a roll change, which may involve a new set of rolls with different diameters from the previous ones, the operator must reset carefully the roll opening indicator and reference for the new roll conditions. Also, during rolling, the actual diameter of the rolls (and therefore $S_0$) changes with temperature as the mill heats up, so that frequent resetting of the roll opening reference $S_0$ must be done by the operator.

SUMMARY OF THE INVENTION

In accordance with the principles of the present invention, gauge control accuracy is materially improved, and this improvement is achieved by means of a method and apparatus based on a new concept of controlled screw travel, which takes into account the actual value of roll constant R as it exists at the time of gauge correction. The invention is based on the principle that the total change in roll force is matched against a reference signal in a sensitive measuring circuit, and that the reference signal is modified as a function of screw travel. The rate at which the screw reference potential changes with screw travel must be such that at the end of a gauge-correcting cycle, the potential change of the screw-operated reference potential is equal to the potential change of the load cell under the new roll force. The correct rate at which the screw-operated reference potential must change can be established mathematically.

The total roll force change equals $$\Delta F \left(1 + \frac{R}{M}\right)$$

and the total screw travel equals $$\frac{\Delta F}{M} \left(1 + \frac{R}{M}\right)$$

The rate of recalibration of the reference potential with screw travel must be the ratio of these two values, which equals M, the mill constant. This is graphically illustrated in FIG. 1, as will be explained presently. In my invention, the reference potential operated by the screws, and the load cell potential which is a function of the rolling load, are continuously compared to one another through a very sensitive comparator, and if a difference of voltage exists between these two outputs, a corrective screw operation is started and maintained until the two values are matched again.

The primary object of the present invention, therefore, is to provide an automatic gauge control system which, through a series of sequential servo-mechanism operations, arrives at a correct setting of the roll opening without any contribution by the operator, thereby eliminating the difficulties inherent in the so-called gagemeter system described earlier.

Another object of the invention is to provide an automatic gauge control system which is directly responsive to changing roll conditions, namely a change in the roll separating force, thereby eliminating the disadvantages of a waiting period referred to above as transport time.

A further object of the invention is to provide a system which makes a total correction for a given change in gauge in one step, rather than in several small steps, by making the system responsive not only to the change in pressure due to changes in the rolling characteristics of the material being rolled (such as incoming gauge, hardness, or temperature changes), but also to the additional changes in pressure produced by the changes in the roll opening made by the automatic gauge control equipment.

Another object of the invention is to provide an automatic re-calibration of the so-called mill spring constant M, which is used as a reference feedback for a change in roll opening.

Still a further object of the invention is to provide a method of automatic gauge control in which the total change in roll force is matched against a reference signal, which is modified as a function of screw travel, so that at the end of the gauge-correcting cycle, the potential change of the screw-operated reference potential is equal to the potential change of the load cell under the new roll force.

These and other objects and advantages of the invention will become more apparent upon consideration of the following detailed description of the preferred embodiment thereof, along with the accompanying drawings.

BRIEF DESCRIPTION OF THE DRAWINGS

FIG. 3 is a block diagram of the automatic gauge control system of the invention, showing Phase I of its operation, in which the mill is being initially set up for the correct gauge, using the servo-mechanisms of the system to adjust the roll opening responsive to the gauge error signal of the thickness gauge;

FIG. 4 is a view similar to FIG. 3, showing Phase II, in which the system is switched over to a mode of operation in which the screw-down control is automatically adjusted to its common starting potential, regardless of gauge and screw-down position;

FIG. 5 shows Phase III of the system, in which the automatic gauge control takes over to operate the screw-down control responsive to changes in the roll force, as detected by the load cells; and FIG. 6 shows the recalibration of the mill constant M, when the potential comparator 38 has a zero volt output, while the gauge error detector is not at zero.

DESCRIPTION OF THE PREFERRED EMBODIMENT

Figure 1:
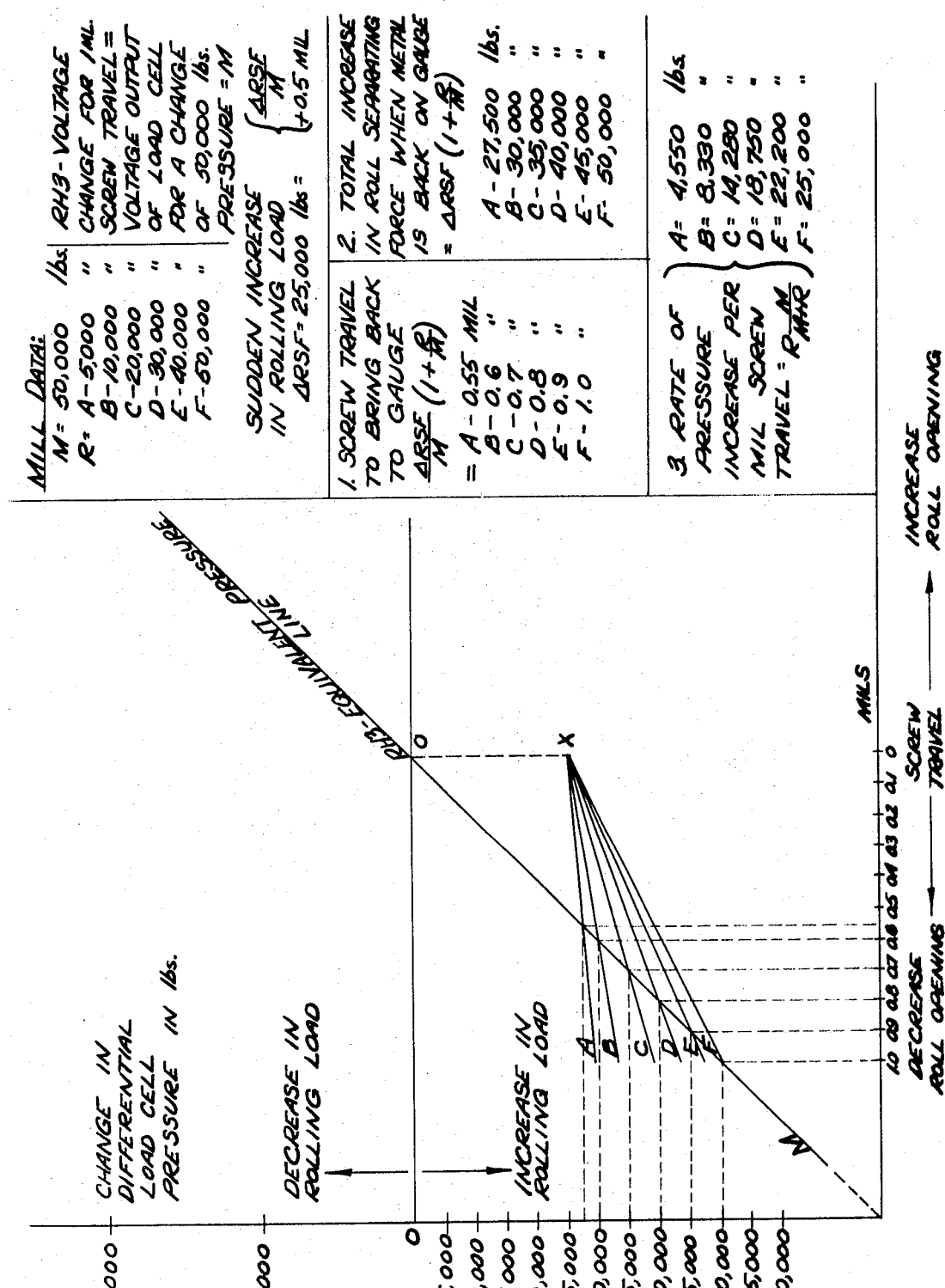
FIG. 1 is a graphical representation of the operating characteristics of the automatic gauge control system of the present invention for various rolling constants R, a mill constant M of 50,000 lbs., and a sudden increase in the roll separating force (rolling load) of 25,000 lbs.

In order to appreciate the problem of producing on-gauge metal, it should be understood that a conventional mill does not maintain the same roll opening under changing roll pressures, but that it is elastic, and that its various components are under tension or compression as the result of the rolling force. If made of steel, its coefficient of elasticity is approximately 30,000,000 pounds per square inch (p.s.i.). In a conventional mill, this results in an elongation of 5 to 10 thousandths of an inch (mil) of the mill housing when the mill is subjected to 75% of its rated maximum roll separating force. In addition to the housing stretch, various parts of the mill are under compression, such as the chocks and rolls, and this results in flattening and bending, and this contributes further to an increased roll opening under load. In a 4-high mill, where the work rolls and backup rolls carry the entire rolling load through a theoretical line contact, roll flattening contributes to the change in effective roll opening.

The total effect of the change in roll opening due to the roll-separating force (RSF) has been referred to as the mill spring. The mill spring coefficient, or mill constant (M) of a mill has been defined as the roll separating force which produces a change in effective roll opening of one mil. This mill constant is of the order of 30,000 to 45,000 lbs. for a conventional mill and an average pass. It is obvious that the so-called mill constant (M)

is not a constant at all, but it changes with the rolling load and with other mill variables.

A second constant which enters into the picture is the rolling constant (R), which has been defined as the roll force necessary to reduce the metal by one thousandth of an inch during a given pass. For example, it it takes a roll force of 1,650,000 lbs. to reduce a given band of metal from 0.120" to 0.065", then the rolling constant (R) equals 1,650,000 lbs. divided by 55, or 30,000 lbs. Like the mill constant (M), the rolling constant (R) is not a constant at all, but varies under the influence of many factors, such as width, alloy, gauge, percent reduction, etc. However, for a given pass, the automatic gauge control operates usually in a narrow range of incoming off-gauge metal, and in this range R can be considered constant for that particular pass.

If the roll force (F) is known, then the reduction taken in the mill at a given moment equals $F/R$ mils. If the mill constant (M) is known, then the total mill spring equals $F/M$ mils. A change in roll force $+\Delta F$ produces an increase in gauge equal to $+\Delta F/M$. The change in reduction equals $\Delta F/R$ and, if it is assumed that the change in rolling force was due to a change in incoming gauge, then the increase in incoming gauge equals $$\frac{\Delta F}{R}+\frac{\Delta F}{M}=\Delta F\left(\frac{M+R}{M\times R}\right)=\Delta F\left(\frac{1}{M}+\frac{1}{R}\right) \text{ mils}$$

To cancel the increase in incoming gauge completely, an increase in rolling force of $$\Delta F\left(\frac{1}{M}+\frac{1}{R}\right)\times R$$

is necessary, which equals $$\Delta F\left(1+\frac{R}{M}\right) \text{ lbs.}$$

This increase in roll force increases the mill spring by $$\frac{\Delta F}{M}\left(1+\frac{R}{M}\right) \text{ mils}$$

which also represents the amount of screw travel necessary to hold constant gauge for an increase in incoming gauge which caused an initial increase in rolling load of $\Delta F$. The first term $\Delta F/M$ is proportional to the change in roll force only if M can be considered a constant. The second term $$\Delta F\left(\frac{R}{M}\right)$$

is proportional to the change in roll force and the rolling constant R. It changes therefore for each different schedule having a different constant R. Thus, to correct for a final increase in pressure of $$\Delta F\left(1+\frac{R}{M}\right) \text{ lbs.}$$

the rolls have traveled a distance of $$\frac{\Delta F}{M}\left(1+\frac{R}{M}\right) \text{ mils}$$

in order to match the change in roll separating force after the metal is back on gauge, the roll opening control mechanism must feed back a signal at the rate of $$\frac{\text{total increase in roll pressure (lbs.)}}{\text{total change in roll opening (mils)}}=\frac{\Delta F\left(1+\frac{R}{M}\right)}{\frac{\Delta F}{M}\left(1+\frac{R}{M}\right)}$$

$$= M \text{ lbs./per mil change in roll opening}$$

FIG. 1 illustrates the change in screw travel necessary for a given initial change in roll force of 25,000 lbs., a mill constant (M) of 50,000 lbs., and rolling constants (R) ranging from 5,000 to 50,000 lbs. The distance OX represents the original change in roll force of 25,000 lbs. (or change in gauge of $F/M$ or $25,000/50,000$ mils=0.5 mil) and the lines XA, XB, XC, XD, XE and XF represent the further increase in pressure as the screwdown operates to nullify the increase in incoming gauge. FIG. 1 shows graphically how, for an initial change of roll separating force of 25,000 lbs. (OX), the intersection of the mill constant (M) line with the pressure line corresponding to the change in roll opening, determines the amount of screw travel to balance these two values.

The automatic gauge control system of the present invention uses this difference between the screw travel reference and the load cell output, to operate the screws until these two quantities are matched, so that their voltage differential has disappeared. In order to make the system operable with an electrical differential control system, a fixed relationship must be established between the voltage change "$A$" of the screw travel reference for a screw travel of one mil (which is needed to compensate for a change in roll force of M pounds), and the change in voltage output B of the load cell for a change in pressure of M pounds. At the end of a gauge correction cycle these two voltage changes must be equal in order to balance the control circuit. The voltage change in the screw travel reference equals $$\frac{\Delta F}{M}\left(1+\frac{R}{M}\right)\times A$$

wherein $$\frac{\Delta F}{M}\left(1+\frac{R}{M}\right)$$

represents the total screw travel. The voltage change in the load cell output equals $$\Delta F\left(1+\frac{R}{M}\right)\times\frac{B}{M}$$

wherein $$\Delta F\left(1+\frac{R}{M}\right)$$

represents the total change in roll separating force. When these two voltages are equal, then $$\frac{\Delta F}{M}\left(1+\frac{R}{M}\right)\times A=\Delta F\left(1+\frac{R}{M}\right)\times\frac{B}{M}, \text{ or } A=B$$

In order to make the system operate correctly the change in screw travel reference voltage for a change of one mil in screw opening must be equal to the change in voltage output of the load cell for a change in pressure of M pounds.

This principle of automatic gauge control provides the fastest and most accurate resetting of the effective roll opening of a rolling mill to compensate for a change in the incoming gauge characteristics. Other systems which, for instance, measure the amount of gauge variation and make a screw correction proportional to error, are incorrect, as the amount of screw travel necessary to correct the gauge depends on the rolling constant (R). FIG. 1, which shows the screw travel for a range of rolling constants from 5,000 lbs. to 50,000 lbs., makes it clear that for a given change in gauge (0.5 mil in this case), the screw travel necessary to correct the gauge changes in the ratio of 2 to 1. The same inadequacy in the amount of screw travel to correct the gauge exists, if the change in roll separating force is used to produce a screw down travel proportional to the change in roll separating force.

Figure 2:
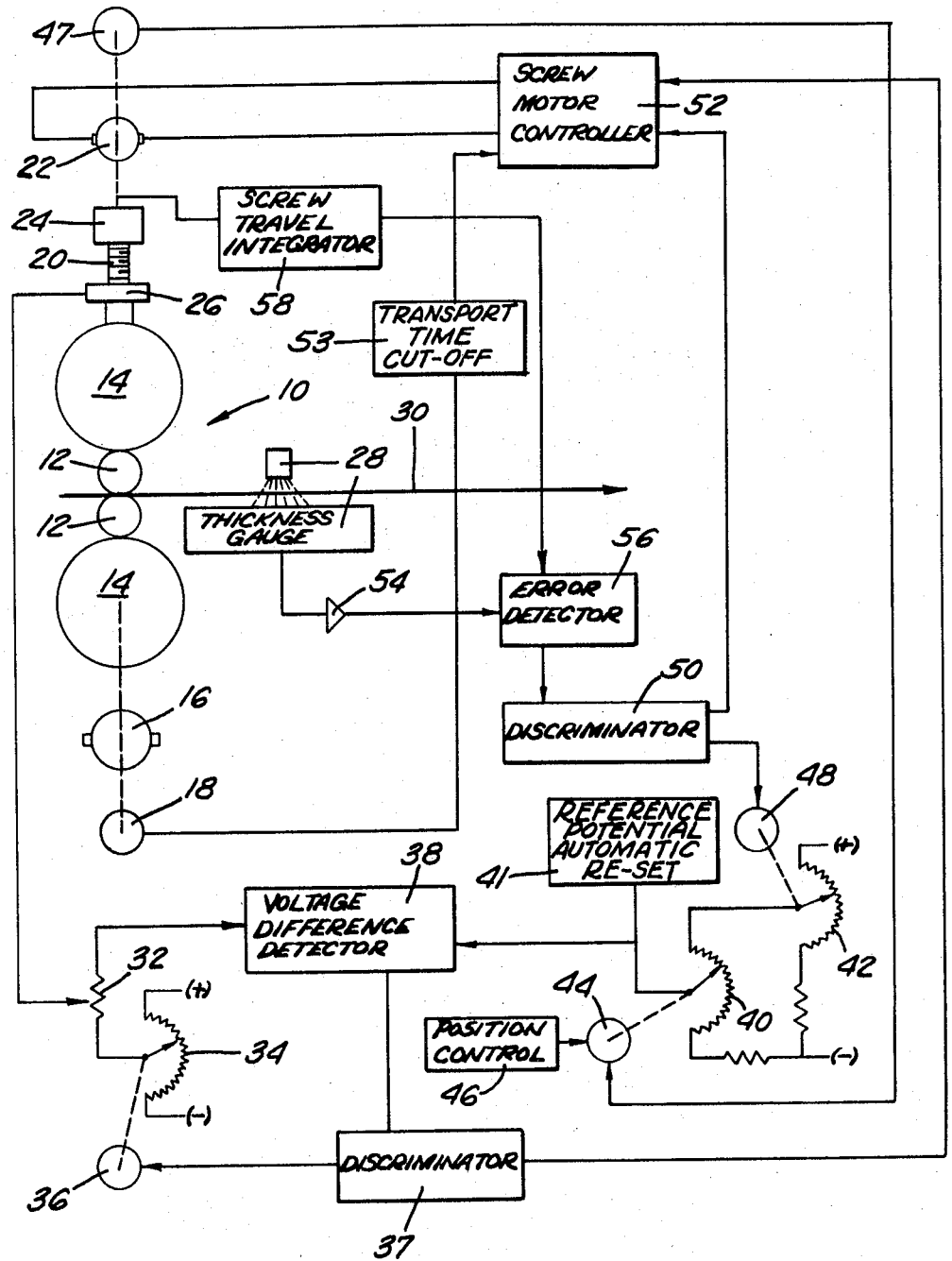
FIG. 2 is a schematic view of a rolling mill with the present invention incorporated therein.

In FIG. 2, the reference numeral 10 designates, in its entirety, a 4-high rolling mill stand comprising work rolls 12, backup rolls 14, driving motor 16 with a tachometer 18, a screw-down 20 operated by a screw-down motor 22 acting through a gear box 24 to adjust the roll opening, and a load cell 26, which is under compression by the rolling load and has a voltage output proportional to this load. On the exit side of the mill is a thickness gauge 28, which is shown as a radiation gauge, but could also be a contacting gauge with a voltage output plus or minus, proportional to the gauge error. Also associated with the mill are a number of control devices to provide the operating characteristics and features of the invention, as will be described in detail presently. The strip passing through the mill is designated by the reference numeral 30.

While the mill 10 shown in FIG. 2 is of the conventional type with the load cell between the screw and upper roll chock, the presently preferred system uses a pre-stressed mill, in which a hydraulic cylinder (not shown) exerts a preload stress on the rolls 12, 14. The work rolls 12 are separated from one another to define the roll opening, by means of wedges (not shown) which are interposed between the chocks (not shown) in which the work rolls are journaled. The said wedges are driven by the screw 20. The mill construction just described is well-known in the art, and forms no part of the present invention, hence it is not shown and described in detail herein.

The pre-stressed type of rolling mill eliminates any dimensional changes in the mill housing during rolling, by keeping the mill housing under a constant tension force, independent of the rolling load. This is equivalent to having a considerably stiffer mill than the conventional mill, and raises the mill constant (M) by 30 to 40%. For a given change in roll-separating force ($\Delta F$) the outgoing gauge changes $\Delta F/M$ mils, and in a typical pre-stressed mill the gauge changes are reduced by 30 to 35% as compared to a standard mill.

Load cells 26 (only one of which is shown in FIG. 2) are typically placed between the roll-positioning wedge and the upper chock on each side of the mill. With no metal in the mill, the entire pre-stressing force is transmitted through the chocks and load cells to the upper end of the housing. While the mill is reducing metal, the roll-separating force (F) exerted by the metal is subtracted from the pre-stressing force acting upon the load cells and is transmitted through the work rolls and backup rolls to the upper chocks. Any change in the roll separating force ($\Delta F$) is reflected in the same change in pressure on the load cells, but with opposite sign.

The output voltage of load cell 26 is transmitted to a resistor 32 and becomes part of the potential of a potentiometer 34, which is driven by a motor 36 that is controlled by a discriminator 37. The combined potential of the load cells 26 and potentiometer 34 is fed into a sensitive voltage differential detector 38, where it is compared to the potential of potentiometers 40 and 42. Potentiometer 40 is driven by a servomotor 44, which is controlled either by a potentiometer position control 46 or by a screw-down position follower 47 in the form of a selsyn transmitter driven by the screwdown motor 22. Potentiometer 42 is driven by a motor 48, which is controlled by a discriminator 50. Discriminator 37 is connected to the voltage differential detector 38, and its output voltage is also fed to a screw motor controller 52. Screw motor controller 52 is also connected to discriminator 50 and to a transport time cut-off 53 which is connected, in turn, to mill tachometer 18.

The output voltage of thickness gauge 28 goes to an amplifier 54, and thence to an error detector 56, which feeds its output signal to discriminator 50. Error detector 56 also receives the output signal of a screw travel integrator 58.

The combined potential of the load cell 26 and a portion of potentiometer 34 as defined by the position of its contact arm, represents a voltage which is compared through a high sensitivity voltage difference detector 38 to a portion of the voltage drop across potentiometer 40, as defined by the position of its contact arm. A change in the roll separating force changes the load cell 26 voltage output and thereby the voltage on one side of the voltage difference detector 38 by the amount of $$\frac{\Delta F}{M} \times B$$

wherein B is the load cell voltage output for a load of M pounds. The voltage difference detector reacts to this voltage imbalance by operating the screws through discriminator 37, screw motor controller 52 and screwdown motor 22 in a direction to re-establish the same voltage in both sides of voltage difference detector 38. This is accomplished by a screw travel feedback to potentiometer motor 44 which changes the tapped voltage of potentiometer 40 applied to the voltage difference detector 38.

If the system is in equilibrium when the material in the mill is on gauge, the voltage of the load cell 26 and potentiometer 34, and potentiometers 40, 42 are the same, and the voltage difference detector 38 is at rest. For any change in the rolling force, the voltage output of the load cell 26 changes, and the equilibrium is upset. If this change in voltage is of sufficient magnitude, the voltage difference detector 38 closes a contact to control the screwdown motor 22 and change the roll opening in the direction to bring the material back on gauge. While the screws are changing, potentiometer 40 is moved proportionately to the screw travel, thus changing the potential applied to the voltage difference detector 38 at a rate equal to M pounds pressure per mil screw travel. The difference in voltage between the two potentials will be reduced to zero when screw travel (in mils) equals $$\frac{\Delta F}{M}\left(1+\frac{R}{M}\right)$$

The system equilibrium is detected by the voltage difference detector 38 and all screw action is stopped when this condition is reached. The only condition for the correct amount of screw travel during an automatic readjustment of the roll opening is the correct choice of the value for the mill constant M and its representative voltage.

Even though M is referred to as the mill constant, it is not a constant over the entire range of gauges, percent reductions, and so on. The present equipment is self-adjusting, so that if a radical change in reductions occurs, the value of M is re-adjusted automatically so that it is corrected for the schedule in progress. The thickness gauge 28 on the delivery side of the mill is used for this purpose, as well as for the original setting up of the automatic gauge control by a change in the roll force.

The adjustment of the equipment takes place automatically at the beginning of each coil through the sequential operation of several servo-mechanisms.

At first, when the automatic gauge control is put into operation with metal in the mill, the thickness gauge 28 is used to bring the metal on gauge by screw-down control in the conventional manner. If the material is off-gauge, an error voltage is sent by the gauge 28 to amplifier 54, and from there to the error detector which, in turn, operates the screw-down motor 22 through the controller 52 in the direction to bring the material on gauge. The screw travel integrator 58 permits the operation of the screws to be proportional to the error, and a mill tachometer generator 18 locks out any further operation of the screws until the corrected section reaches the thickness gauge. The time of screw-down lockout is referred to as transport time, and is inversely proportional to mill speed. If at the end of the transport time, the material is still off-gauge by a sufficient amount to operate the error detector 56, a second correction will take place in the same manner.

If no further correction takes place for several seconds, indicating that the material is on gauge, the automatic gauge control switches automatically to a new mode of operation, namely screw-down control as a function of a change in the rolling load. Before this type of control can take place as described above, the equipment sets itself up automatically for this operation through the operation of two servo-mechanisms. First, while the screwdown was operating under the control of the thickness gauge 28, the potentiometer position control 46 acting through motor 44 returned potentiometer 40 to its center position. The potentiometer arm, which is connected electrically to the voltage difference detector 38, is at a predetermined fixed voltage to the negative side of the power supply. A second voltage supply to the voltage differential detector 38 is made up of the voltage output of the load cell 26 and potentiometer 34.

At the time when the automatic gauge control is ready to switch from the mode of operation which uses the gauge error output for screw-down control, the voltage differential detector 38 is activated with its output first connected through discriminator 37 to potentiometer motor 36. If the two voltages connected to the voltage differential detector 38 are not equal, the output of this detector will energize motor 36 through discriminator 37 and move potentiometer 34 in a direction to equalize these two voltages. When this condition is reached, motor 36 stops, and the system is in balance with the metal on gauge. Any change in the roll separating force which is sufficient to operate the voltage difference detector 38 from then on will produce a change in the screw position through discriminator 37, as described above.

The present invention includes also an automatic recalibration of the mill constant M which is used as a feedback signal from potentiometer 40 operated by the screws. The amount of change in roll opening to compensate for a change in rolling force depends on the rate of voltage change of the operating arm of potentiometer 40 per unit travel. To be correct, the voltage change for a change in roll opening of one thousandth of an inch, must be equal to the voltage corresponding to a pressure change in the load cell equal to the mill constant M. As previously stated, M is not an absolute constant over the entire range of operating conditions, and a wrong value for M could result in a faulty operation of the automatic gauge control system based on the principle of screw-down control by a change in rolling load. However, the system is designed to re-adjust itself to the correct value of M, if such a readjustment is necessary. If the voltage differential detector 38 is balanced, indicating that the combined load cell and potentiometer 34 voltage is equal to the combined voltage of potentiometers 42 and 40, while at the same time a gauge error exists, the following action will take place: The gauge error will produce a voltage output from the thickness gauge 28, which is amplified by the amplifier 54 and which through the discriminator 50 operates potentiometer 42 through its motor 48. The movement of potentiometer 42 changes the voltage across potentiometer 40, thereby upsetting the balanced condition of voltage differential detector 38. This initiates a screw motion in a direction to reduce or eliminate the gauge error. As soon as voltage differential detector 38 starts the screws in motion, motor 48 is de-energized and potentiometer 42 stopped in its new position. The increased or decreased voltage across potentiometer 40 changes the voltage per unit travel of this rheostat, which is equivalent to saying that it changes the value of M in the feed back circuit.

FIG. 3 is a block diagram, showing Phase I of the system, in which the several servo-mechanisms are used to initially adjust the roll opening automatically to produce the correct gauge, utilizing the gauge error signal of thickness gauge 28 to operate the screw motor 22.

In FIG. 4, the system has switched over to Phase II, in which the servo-mechanisms adjust the roll force to screw-down control system automatically to its common starting potential regardless of gauge and screw-down position.

In FIG. 5, the system has switched to Phase III, in which the automatic gauge control takes over to operate the screw-down control responsive to changes in the roll force, as detected by the load cell 26.

FIG. 6 shows the recalibration of mill constant M when potential comparator 38 is at balance and while the gauge error detector 56 has an output.

From the foregoing description, it will be apparent to those skilled in the art that the present invention provides an automatic gauge control system based on the principles of (1) detecting a change in the voltage output of a load cell, which is responsive to rolling load changes; (2) initiating a gauge corrective action by changing the roll opening; and (3) using the feedback system from the roll opening control mechanism, which stops the change in roll opening when the metal is back on gauge. It is this feedback system, which takes into account the increased change in rolling force during gauge correction, as well as the original change in rolling force, that distinguishes the present invention from other automatic gauge control systems and makes it superior to them.

Another novel and important feature of the invention is the sequential operation of the system, whereby automatic gauge control by gauge error to screw-down control, is followed by automatic change-over to a system of gauge control by rolling load to screw-down control, in which the mill constant M is automatically adjusted to the correct value for a given pass.

While I have shown and described in considerable detail what I believe to be the preferred form of my invention, it will be understood by those skilled in the art that the invention is not limited to the embodiment described, but instead, might take various other forms.

I claim:

1. In a strip rolling mill having a pair of work rolls, with screw-down means for adjusting the space between them, and a load cell having a voltage output proportional to the roll-separating force exerted by the strip, an automatic gauge control system comprising:

means for producing a reference potential which is modified as a function of the change in position of said screw-down means; and a voltage differential measuring device operable to actuate said screwdown means responsive to a difference in potential between said load cell voltage and said reference potential;

said means for producing a reference potential comprising a first potentiometer having a first movable contact wiping on a first stationary element, and a second potentiometer having a second movable contact wiping on a second stationary element, said first movable contact being connected to said second stationary element, and said second movable contact being connected to said voltage difference detector;

a thickness gauge for measuring the thickness of the strip issuing from said work rolls, said thickness gauge having an electrical output signal that is a function of the amount of gauge-error in the finished strip;

means responsive to the position of said screw-down means for controlling the movement of said second movable contact on said second stationary element; and means responsive to a gauge error signal from said thickness gauge for moving said first movable contact along said first stationary element in the direction to change said reference potential and thereby actuate said screw-down means to bring said strip back onto gauge.

2. An automatic gauge control system as in claim 1, wherein said reference potential is modified as a function of the change in position of said screw-down means at a rate such that for each one thousandth of an inch travel of the screw-down means, said reference potential is changed by an amount equal to the change in voltage output of said load cell for a change in pressure equivalent to the mill constant M.

3. An automatic gauge control system as in claim 2, which is further characterized by means for automatically recalibrating said reference potential for a new mill constant M; and means for automatically calibrating said load cell output voltage and said reference potential to zero differential when the finished strip is on gauge.

4. In a strip rolling mill having a pair of work rolls, with screw-down means for adjusting the space between them, and a load cell having a voltage output proportional to the roll-separating force exerted by the strip, an automatic gauge control system comprising:

a first system of gauge control by gauge error, and a second system of gauge control by change in rolling load;

said first system including a thickness gauge for measuring the thickness of the strip issuing from said work rolls, said thickness gauge having an electrical output signal that is a function of the amount of gauge-error in the finished strip;

and means responsive to a gauge-error signal from said thickness gauge for actuating said screw-down means in the direction to bring said strip back onto gauge;

said second system including means for producing a reference potential which is modified as a function of the change in position of said screw-down means at a rate such that for each one thousandth of an inch travel of the screw-down means, said reference potential is changed by an amount equal to the change in voltage output of said load cell for a change in pressure equivalent to the mill constant M;

and a voltage difference measuring device operable to actuate said screw-down means responsive to a difference in potential between said load cell voltage and said reference potential; and means for automatically switching from said first system to said second system when said thickness gauge indicates that said strip is on gauge.

5. An automatic gauge control system, as in claim 4, which is further characterized by means for automatically calibrating the load cell voltage and reference potential to zero differential when the strip is on gauge, during the operation of said first system.

6. The method of controlling the gauge of a strip passing through a rolling mill having a pair of work rolls, a screw-down mechanism for controlling the opening of said work rolls, and gauge means on the exit side of said work rolls having an output signal representative of gauge error in the strip issuing from the work rolls, comprising the steps of:

initially correcting gauge by gauge error, as detected by said gauge means, using said output signal from said gauge means to actuate said screw-down means in the direction to bring the strip back onto gauge;

then switching to gauge correction by rolling load, as detected by said load cell, said operation of gauge correction by rolling load being accomplished by the steps of:

measuring the roll separating force exerted by said strip on said work rolls with a load cell producing a rolling load voltage that is a function of the gauge-error of the strip;

producing a reference potential that is modified as a function of the change in position of said screw-down mechanism at a rate such that for each one thousandth of an inch travel of the screw-down mechanism, said reference potential is changed by an amount equal to the change in said rolling load voltage for a change in pressure equivalent to the mill constant M;

comparing said reference potential to said rolling load voltage;

utilizing any imbalance between said rolling load voltage and said reference potential to actuate said screw-down mechanism so as to bring said strip back onto gauge.

References Cited

UNITED STATES PATENTS

| | | | |
|---|---|---|---|
| 3,128,630 | 4/1964 | Briggs | 73—432 |
| 3,269,160 | 8/1966 | Halter et al. | 72—8 |
| 3,287,946 | 11/1966 | Perrault et al. | 72—8 |
| 3,342,047 | 9/1967 | Briggs | 72—8 |
| 3,492,844 | 281970 | Silva | 72—8 |

MILTON S. MEHR, Primary Examiner

U.S. Cl. X.R.

72—16, 21